Jan. 17, 1967  S. A. COGSDILL  3,298,256
DEBURRING TOOL
Filed Jan. 3, 1964
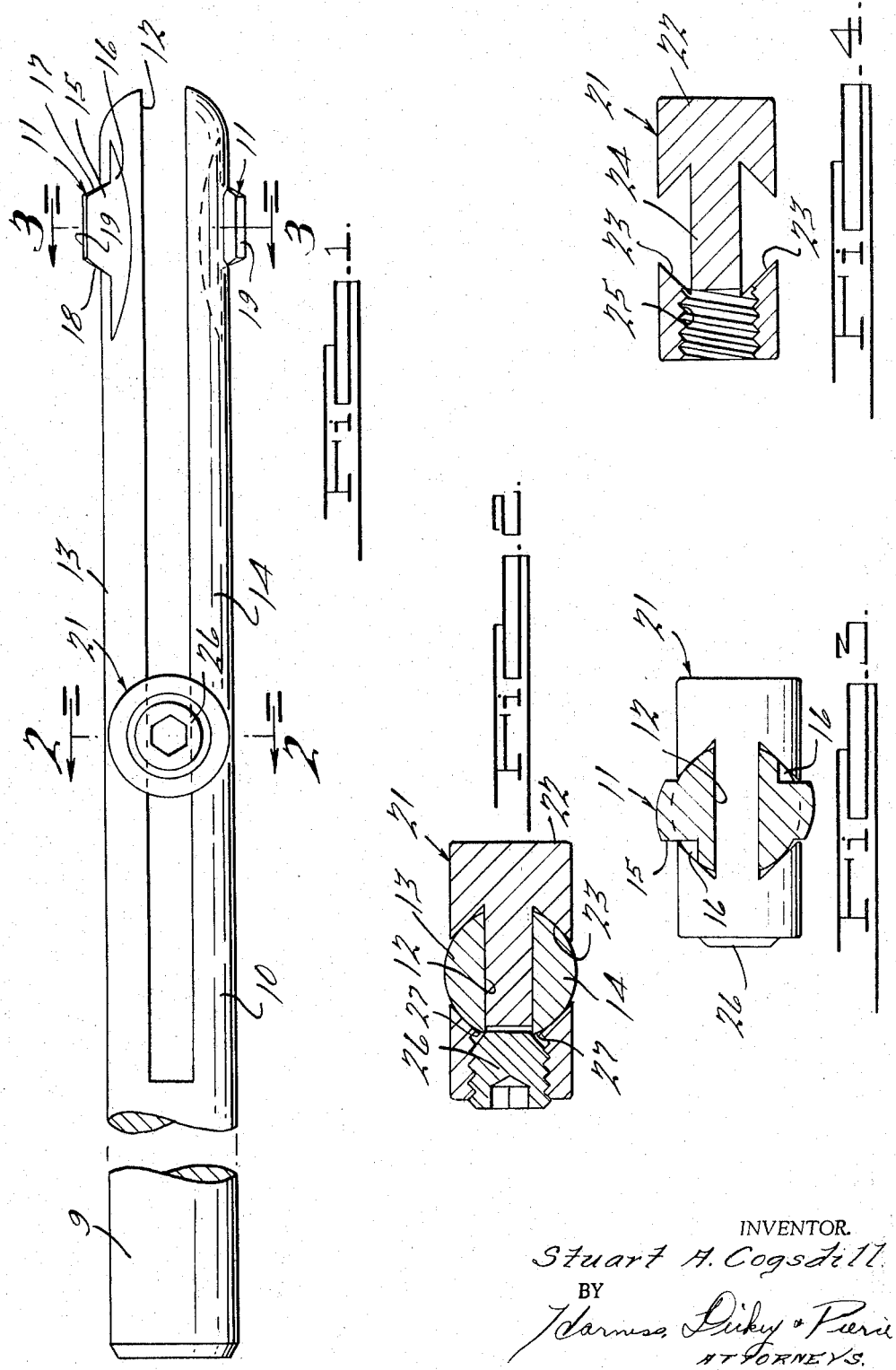
INVENTOR.
Stuart A. Cogsdill
BY
Harness, Dickey & Pierce
ATTORNEYS.

United States Patent Office 3,298,256
Patented Jan. 17, 1967

3,298,256
DEBURRING TOOL
Stuart A. Cogsdill, Orchard Lake, Mich., assignor to Cogsdill Tool Products, Inc.
Filed Jan. 3, 1964, Ser. No. 335,469
5 Claims. (Cl. 77—73.5)

This invention relates to deburring tools, and particularly to a deburring tool of the pressure adjustable type.

Various types of deburring tools have been provided in the art, some of which have pivoted blades which are cammed out of a slot in position to engage the burr at one or both ends of an aperture. The burr is cut from the end when the cutting edge is advanced to the surface of the member containing the aperture or passed through the aperture and returned therefrom to cut the burr from both sides thereof. Other types of tools had a blade which was mounted on a spring arm which extended from a slot in the body in which the blade was deflected by the deflection of the spring when passed through an aperture. Another type of deburring tool was that having a slot through the center of the body with adjustable means on the center line thereof on the end opposite to that having the cutting edges for controlling the deflection of the two spaced prong portions of the body.

In practicing the present invention, a body is employed having a slot extending from the cutting end along a substantial length of the body to a shank or driving end. Near the cutting end of the body each of the tines formed by the slot has a cutting tooth extending outwardly thereof with sloping cutting edges at the forward and rear ends which are relieved circumferentially of the teeth. The body is heat treated after it is machined to provide resiliency which permits the tines to deflect so that the cutting teeth can pass through an aperture and return therefrom to cut the burrs from both ends of the aperture. Such a tool is satisfactory for the metal of a particular workpiece, but when more or less resistance to deflection is desired for other types of metals, a fulcrum element is provided which is adjustable along the slot to change the effective length of the tines and thereby change the resistance to deflection thereof.

The fulcrum element has a central rectangular patform portion and enlarged end portions formed by oppositely disposed spaced dovetail slots which receive the tines when the platform portion is slid within the slot from the open end thereof. A setscrew in one of the enlarged end portions engages the edges of the tines to lock the fulcrum element in adjusted position to change the effective length of the tines. Projecting cutting fingers extend from the tines having forward and rearward cutting edges which are relieved rearwardly with the cutting edges in position to produce a deburring operation at both ends of an aperture. The tines are deflected toward each other after the deburring operation is performed on the entrance side of the member and after being advanced through the aperture and expanded, the deburring operation is performed on the opposite end of the aperture upon the withdrawal of the tool therefrom.

Accordingly, the main objects of the invention are: to provide a deburring tool having spaced tines carrying cutting teeth having sloping cutting edges at the forward and rearward ends for deburring opposite ends of an aperture; to provide a deburring tool with a central slot to provide spaced tines which are deflectable toward each other from a fulcrum element disposed within the slot and secured at adjusted positions therealong for regulating the effective lengths and resistance to deflection of the tine; to provide a fulcrum for adjustment along a slot between a pair of tines of a tool with oppositely disposed dovetail slots which receive the tines when a central platform portion is disposed within the slot and anchored therein by a setscrew which engages one edge of the tines; and in general, to provide a deburring tool which is simple in construction, positive in operation and economical of manufacture.

Other objects and features and novelty of the invention will be specifically pointed out or will become apparent when referring, for a better understanding of the invention, to the following description taken in conjunction with the accompanying drawing, wherein:

FIGURE 1 is a broken view in elevation of a deburring tool embodying features of the present invention;

FIG. 2 is a sectional view of the structure illustrated in FIG. 1, taken on the line 2—2 thereof;

FIG. 3 is a sectional view of the structure illustrated in FIG. 1, taken on the line 3—3 thereof; and FIG. 4 is a sectional view of the fulcrum element illustrated in FIG. 2.

The deburring tool of the present invention has a hardened cylindrical body 10 with a driving shank portion 9 at one end and with cutting teeth 11 at the opposite end. A slot 12 extends through the body 10 from the cutting end to the shank portion 9 to form spaced spring tines 13 and 14 which are deflectable toward each other at the open end of the slot. As illustrated in FIG. 3, the teeth 11 are disposed outwardly from the tines and have a front face 15 which extends within the body of the tines to form recessed portions 16 to provide chip clearance areas. Each of the teeth have a forward cutting edge 17 and a rearward cutting edge 18 which slopes at an angle so as to act as a cam and cause the forward end of the tines to deflect inwardly toward each other so that the teeth can enter the aperture after cutting the burr from the forward face of the member containing the aperture. After the teeth pass through the aperture, the tines will move outwardly to have the cutting edges 18 cut the burr from the rearward face of the aperture upon the withdrawal of the tool therefrom. The cutting edges are relieved rearwardly as well as the top edge 19 of the tool to prevent any binding of the teeth within the aperture. The top edge 19 of the teeth does not cut but acts as cam followers to maintain the ends of the fulcrum arms deflected while passing through the aperture.

The fulcrum element 21, as herein illustrated, has a cylindrical body 22 containing oppositely disposed dovetail slots 23 leaving a central platform portion 24 the width of the slot 12. The central portion 24 is received in the slot when the tines 13 and 14 extend within the dovetail slots 23 of the body 21, as clearly illustrated in FIG. 2. The teeth 11 are of a length to extend within the open portion of the dovetail slots as illustrated in FIG. 3. A threaded aperture 25 extends within one end of the body 22 into the slots 23, with its center on the central plane of the central portion 24, as clearly illustrated in FIG. 4. When a setscrew 26 is threaded within the slot, it will be advanced therein against the edges 27 of the tines 13 and 14 to lock the fulcrum element 21 in adjusted position. The tool body 10 is hardened so that the softer setscrew 26 will not damage the edges 27 when advanced into engagement therewith permitting the dovetail element 21 to be readily adjusted along the slot.

With this arrangement a rectangular central portion 24 is clamped between the two tines 13 and 14 at any point along the slot there-between to shorten or lengthen the effective portion of the tines to have only the length forwardly of the platform portion 24 deflectable toward each other. When the platform portion is advanced toward the cutting end and secured in position, the tines are shortened and a greater force is required to deflect the ends sufficiently to have the cutting edges pass within the aperture. This provides assurance that the burr of tough material will be cut from the end of the aperture before the teeth are deflected and moved within the aperture. When softer material is to be burred, the fulcrum element 21 is moved further away from the cutting end so as to have longer tines of less strength which require less force to deflect the teeth sufficiently to pass within an aperture. When the same workpiece and material has an aperture to be burred, then the tool can be furnished without the fulcrum element 21 as the proper strength to the tines for the paricular material can be provided.

What is claimed is:

1. In a deburring tool, an elongated body having a slot extending inwardly from the cutting end to form two like spring tines on a driving shank portion, a tooth extending outwardly from at least one tine at the cutting end, and a fulcrum element having oppositely disposed dovetail slots and a central portion therebetween, said dovetail slots receiving the tines when the central portion is disposed in the slot therebetween.

2. In a deburring tool, an elongated body containing a central slot extended therealong from the cutting end to a driving shank portion forming spaced spring tines, a cutting tooth on at least one of said tines, and a fulcrum element having a rectangular platform portion disposed in said slot for adjustment therealong, and means for locking the platform portion in adjusted position.

3. In a deburring tool a cylindrical body containing a central slot extending inwardly from the cutting end to a shank portion forming spaced spring tines, a cutting tooth on each tine located on the central arcuate portion thereof with sloping cutting edges disposed in a chordal plane which extends within the body of the tines to provide a chip clearance area, and a fulcrum element comprising a body having oppositely disposed dovetail slots and a central rectangular portion therebetween, said dovetail slots receiving the tines when the central rectangular portion is disposed within the slot between the tines.

4. In a deburring tool a cylindrical body containing a central slot extending inwardly from the cutting end to a shank portion forming spaced spring tines, a cutting tooth on each tine located on the central arcuate portion thereof with sloping cutting edges disposed in a chordal plane which extends within the body of the tines to provide a chip clearance area, and a fulcrum element comprising a body having oppositely disposed dovetail slots and a central rectangular portion therebetween, said dovetail slots receiving the tines when the central rectangular portion is disposed within the slot between the tines, and means carried by said fulcrum element by which it is secured in adjusted position on said tines.

5. In a deburring tool a cylindrical body containing a central slot extending inwardly from the cutting end to a shank portion forming spaced spring tines, a cutting tooth on each tine located on the central arcuate portion thereof with sloping cutting edges disposed in a chordal plane which extends within the body of the tines to provide a chip clearance area, and a fulcrum element comprising a body having oppositely disposed dovetail slots and a central rectangular portion therebetween, said dovetail slots receiving the tines when the central rectangular portion is disposed within the slot between the tines, one end of the fulcrum element body having a threaded aperture which extends within at least one of said dovetail slots, and a setscrew in said threaded aperture for engaging at least one of said tine and locking the fulcrum element in adjusted position.

References Cited by the Examiner
UNITED STATES PATENTS 2,562,347  7/1951  Young _____ 145—50.4

FOREIGN PATENTS 671,341  10/1963  Canada.

FRANCIS S. HUSAR, *Primary Examiner.*